Oct. 18, 1966 H. FEUCHT 3,280,267

CROSS-WIRE CONTROL CIRCUIT ARRANGEMENT FOR COMMUNICATION SYSTEMS

Filed March 8, 1963

United States Patent Office 3,280,267

Patented Oct. 18, 1966

3,280,267

CROSS-WIRE CONTROL CIRCUIT ARRANGEMENT FOR COMMUNICATION SYSTEMS

Hermann Feucht, Munich, Germany, assignor to Siemens & Halske Aktiengesellschaft, Berlin and Munich, a German corporation Filed Mar. 8, 1963, Ser. No. 263,905

Claims priority, application Germany, Mar. 15, 1962, S 78,503

6 Claims. (Cl. 179—18)

Figure 1:
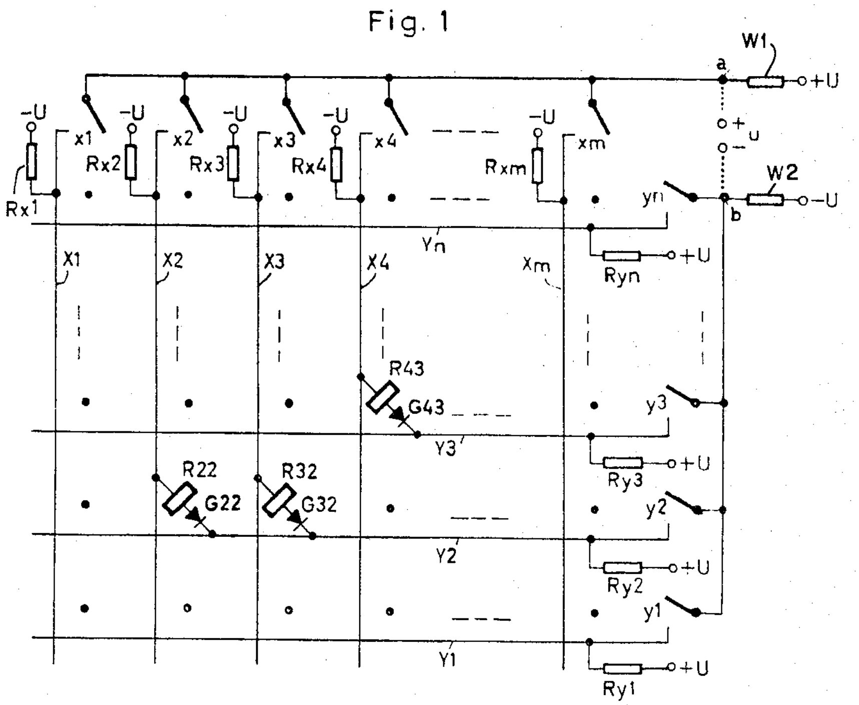

The invention disclosed herein relates to a circuit arrangement for communication systems, and is particularly concerned with control devices constructed in crossing-field or cross-wire fashion, wherein directional conductors or diodes, for example, rectifiers, are individually disposed ahead of input circuit or switching means, for decoupling the same at crossing points of line- and column conductors, there being continuously connected to said conductors, in a high resistance circuit, an auxiliary voltage which affects all decoupling diodes in blocking sense, and comprising means for selectively connecting to the input leads of said line- and column conductors, in a low resistance circuit, an opposing control voltage for operatively affecting the input circuit means at the crossing points thereof.

The German Patent No. 1,075,675 describes a circuit arrangement in which said auxiliary voltage is, due to the control voltage superimposed thereon in a given case, practically of a magnitude as high as the blocking voltage appearing at the decoupling diodes.

Further circuits are formed in such relay couplers responsive to the energization of a relay, via the line- and column leads, to which the relay is connected. Two of such circuits which extend via resistors of this line- and column lead, do not affect the coupling relays and therefore will be disregarded hereinafter.

In the circuit arrangement according to the German Patent 1,075,675, there are also formed circuits extending via all relays of the coupling field, in such a manner, that the requirements for non-operate current flow cannot be reliably met for some of the relays. (The designation "non-operate current" is intended to mean current supplied to a relay or the like without affecting operative actuation thereof.) The difficulties in meeting this requirement are due to the following condition: Upon operatively connecting one column- and one line lead, the coupling relay lying at the corresponding crossing point will be connected with the potential extended to the respective lead, and all unconnected column leads (line leads) will likewise be connected to such potential, via the remaining coupling relays of a line (column); moreover, all unconnected line- and column leads are mutually interconnected via the coupling relays disposed at all the crossing points thereof. Accordingly, upon operatively switching in via a column- and a line lead, a single coupling relay which is disposed at the corresponding crossing point, there will be switched in a network of circuits including all remaining coupling relays. In this network, the rectifiers disposed in series circuit with the remaining coupling relays of the switched in line- and column leads, are traversed by current in pass direction and the rectifiers connected in series relation with the coupling relays of all unconnected line- and column leads, are affected by current in blocking direction. The magnitude of this current is substantially determined by the blocking resistance of the rectifiers. The current traversing the rectifiers in blocking direction is so low that the operative energization of coupling relays which are respectively connected therewith and which lie at crossing points of unconnected line- and column leads, is reliably prevented. The sum of the currents flowing in the coupling relays which are respectively individually serially connected with the rectifiers which are traversed by current in blocking direction, at the crossing points of an unconnected column lead (line lead) and all unconnected column leads (line leads), results always in a current flowing in a single coupling relay at the crossing point of an operatively switched in line lead (column lead) and in the unconnected column lead (line lead). In the case of coupling fields of relatively large size, that is, having a great number of line- and column leads, this current can increase to a point at which the non-operate requirement for the coupling relays cannot be met.

This situation results in limiting the size of coupling fields of the known kind. It is in given cases required to subdivide the relay coupler so as to avoid the above indicated drawbacks.

The object of the invention is to avoid all the indicated disadvantages by placing within the potential range of the auxiliary voltage, the potentials of line- and column leads at which the control voltage becomes effective, thereby making it possible to produce with the use of similar components considerably larger relay couplers.

Upon operative energization of a relay lying at a crossing point of a given line and a column, the total blocking current which flows through the rectifiers of all the relays which lie respectively at the crossing points of all other lines and all other columns, is advantageously kept away from the remaining relays of the given line and column. Another advantage of the invention resides in that the rectifiers of all other relays of the same relay coupling crosswire field are blocked upon operatively effective energization of a relay. A further considerable advantage resides in the possibility of constructing relay coupling crosswire fields as large as possible without resorting to subdivision. Still another advantage resides in the possibility, resulting from the elimination of the non-operate current requirement for the coupling relays of increasing the sensitivity thereof or increasing the control voltage therefor, thereby enabling considerably faster operative actuation of the coupling relays.

The various objects and features of the invention will appear from the description which is rendered below with reference to the accompanying drawings, showing an embodiment thereof.

Figure 2:
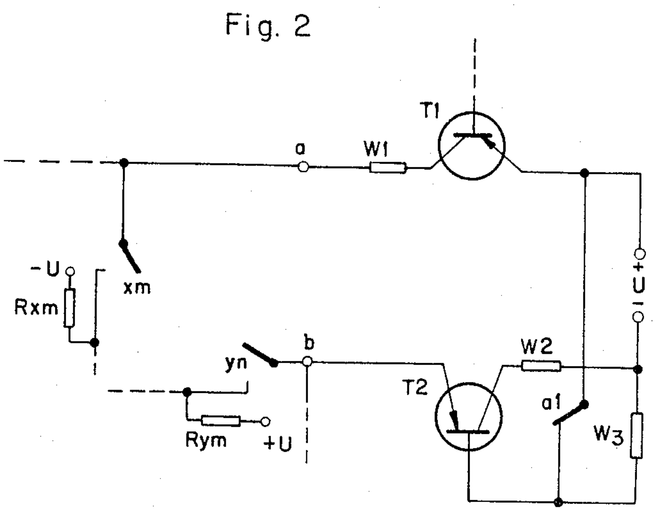

FIG. 1 shows an embodiment of the invention with two modes of operation thereof; and FIG. 2 shows a modification of the circuit arrangement.

The two modes of operation of the embodiment are indicated in FIG. 1 respectively by dotted lines extending from the points *a* and *b* and terminating in a direct voltage source $+u$, $-u$ and by full lines extending from the points *a* and *b* via resistors W1, W2 which are connected to a common direct voltage source +U, −U.

The variant involving the dotted lines and the voltage source $+u$, $-u$ will be described first.

There are provided a number of line leads or conductors Y1 . . . Y*n* and column leads or conductors X1 . . . X*m*. The line leads (column leads) are individually alternatively switched in via contacts *y*1 . . . *y*n (*x*1 . . . *xm*. In the normal or resting condition, the rectifiers of all coupling relays are in known manner biased in blocking direction. Upon connecting the voltage source *u* to a line lead, for example, via contact *y*2 to the line lead Y2, and via contact *x*2 to the column lead X2, the coupling relay R22 will be energized in known manner. The voltage of the source *u*, for energizing the coupling relay R22, is lower than the voltage of the source U to which are fixedly connected the biasing resistors R*x*1 . . . R*xm*, Ry1 . . . Ry*n*. Moreover, the potentials of the two voltage sources +U, −U and +*u*, −*u*, are graduated in the following sequence, namely (1) +U, +*u*, −*u*, −U Upon energization of a coupling relay such, for example, as R22, the rectifiers of the coupling relays at the crossing points of the unconnected line- column leads are via the resistors, for example, R*x*1, R*x*3 . . . R*xm*, R*y*1, R*y*3 . . . R*yn*, in known manner biased in blocking direction. For example, the rectifier G43 is biased in a circuit (2) +U, R*y*3, *y*3, G43, X4, R*v*4, −U Likewise biased are the rectifiers of all coupling relays which lie at crossing points between a switched-in (connected) line lead (column lead) and the unconnected column leads (line leads). For example, the rectifier G32 is biased via a circuit (3) −*u*, (*b*), *y*2, Y2, G32, R32, X3, R*x*3, −U The second mode of operation of the embodiment illustrated in FIG. 1 shall be described next:

The voltage source +*u*, −*u* is omitted in such variant, and the points *a*, *b* are via resistors W1, W2 connected to the same voltage source +U, −U as the biasing resistors R*x*1 . . . R*xm*, R*y*1 . . . R*yn*. In the normal of resting condition of the arrangement, all rectifiers G . . . are biased in known manner. In the operating condition, all rectifiers G . . . except the one disposed in the energizing circuit of a relay R . . . are likewise biased in the same manner as described above in connection with the first mode of operation. The required voltage gradations or stages which are according to the first mode of operation available as a result of using a special voltage source +*u*, −*u* which had a lower voltage, are in the second mode of operations produced at a relay which is operatively energized, by series resistors in the energizing circuit of the respective relay. The operation conforms otherwise to the operation described in connection with the first mode of operation. A particular advantage of the second mode of operation resides in that the voltage drop is utilized which appears at the series resistors W1, W2 upon operative energization of a given coupling relay, instead of using a special voltage source +*u*, −*u*.

FIG. 2 shows a modified circuit arrangement employing transistors, for example, transistors T1, T2, serving for the switching through of the circuits. Circuits which are respectively prepared by the actuation of relay contacts, for example, contacts such as *x*2, *y*2, and which extend via a line lead and a column lead, for example, Y2, X2, the relay, for example R22 lying at the crossing point, and via the serially disposed rectifier G22, are by the operation of the transistors made operatively effective (or ineffective) after (or before) the closure (or opening) of said relay contacts. It is in this manner possible to actuate the mechanically operable contacts while they are not traversed by current, thereby greatly increasing the useful life thereof.

In order to avoid overloading of the transistors by loss effects, they are controlled either in extremely high resistance or extremely low resistance circuits, by making the base potential either more positive than the emitter potential, or taking care that the collector potential cannot become more negative than the base potential. The last noted requirement is met by connecting the base via a series resistor with a sufficiently negative potential.

Closure of one of the control contacts, for example, *x*2, *y*2, which connects a column- and line lead, for example, X2, Y2, and likewise closure of the auxiliary contact *a*1, will cause the base potential, for example, of the transistor T2, to become more positive than the emitter potential, since the relatively high resistance biasing resistors R*y* . . . R*x* . . . form with all coupling relays R . . . and the rectifiers G . . . which are affected in blocking directions, a voltage divider, so that a partial voltage potential appears at the common feed point *b* with respect to which the plus potential lying via the contact *a*1 on the base of the transistor T2, is more positive. Upon opening the auxiliary contact *a*1, a base current of the transistor T2 will flow to the minus potential via the resistor W3, thereby making such transistor conductive. The transistor T1 is controlled in similar manner. One of the relays, for example, R22 energizes in the circuit (4) (FIG. 2) +, T1, W1, (*a*), (FIG. 1) *x*2, X2, R22 G22, Y2, *y*2 (*b*), (FIG. 2) T2, W2

The current in this circuit causes a voltage drop at the resistor W2, as described before in connection with FIG. 1, such voltage drop securing the base current, for example, at the transistor T2, the resistor W3 determining thereby the required magnitude of the base current.

A particular advantage of this arrangement resides in that the voltage drop occurring upon operative actuation of a coupling relay, for example, at the resistor W2, can be utilized to serve for the blocking and therewith the biasing of the rectifiers G . . . of all coupling relays R . . . at crossing points between a switched-in (connected) line lead for example, Y2 and all unconnected column leads, for example, X1, X3 . . . X*m*, and also for making a transistor, for example, transistor T2, conductive.

Changes may be made within the scope and spirit of the appended claims which define what is believed to be new and desired to have protected by Letters Patent.

I claim:

1. For use in a communication system, a circuit arrangement for a control device constructed in cross-wire fashion, having relay means disposed at crossing points of line and column leads and an individual rectifier connected in series with each relay winding for decoupling the same, high resistance circuit means including biasing resistors for continuously connecting an auxiliary voltage to said rectifiers which voltage is operative to bias all rectifiers in blocking sense, and means for selectively connecting to the line and column leads in low resistance circuits a control voltage of opposite polarity and smaller than said biasing voltage, which is effective to operatively affect the respective relay means, the potentials on the line and column leads at which the control voltage is operatively effective, lying within an intermediate portion of the potential range of the absolute value of the auxiliary voltage.

2. A circuit arrangement according to claim 1, comprising first biasing resistor means connected respectively to each column lead and to one pole of a first voltage source, second resistor means connected respectively to each line lead and to the other pole of said first voltage source, first control contact means connected to one pole of a second voltage source for selectively connecting one pole of the second voltage source to the respective column leads, and second control contact means connected to the opposite pole of the second voltage source for selectively connecting the opposite pole of said second voltage source to the respective line leads.

3. A circuit arrangement according to claim 1, comprising first biasing resistor means connected respectively to each column lead and to one pole of a given voltage source, second resistor means connected respectively to each line lead and to the other pole of said voltage source, first control contact means connected to one pole of said current source for selectively connecting said pole to the respective column leads, and second control contact means connected to the opposite pole of said current source for selectively connecting such pole to the respective line leads.

4. A circuit arrangement according to claim 3, comprising first and second circuit means for respectively interconnecting said first and said second contact means, each said circuit means including a resistor connected to a pole of said current source.

5. A circuit arrangement according to claim 3, wherein the operatively effective control current is conducted via a switching transistor, comprising first circuit means including a first resistor and a first transistor for connecting a pole of said current source to said first contact means, and a second circuit means including a second resistor and a second switching transistor for connecting the opposite pole of said current source to said second contact means.

6. A circuit arrangement according to claim 5, comprising further circuit means extending between the emitter of the first transistor and the base of the second transistor, auxiliary contact means included in said further circuit means for controlling the base current of said second transistor to obtain the driving voltage for making the second transistor conductive, said driving voltage appearing as a voltage drop at said second resistor which is traversed by the control voltage.

References Cited by the Examiner

UNITED STATES PATENTS

| | | | |
|---|---|---|---|
| 2,876,366 | 3/1959 | Hussey | 179—18.7 |
| 2,883,467 | 4/1959 | Ketchledge | 179—18.7 |
| 3,099,752 | 7/1963 | Schwenzfeger | 179—18 |
| 3,107,341 | 10/1963 | Ulmer | 340—166 |

FOREIGN PATENTS

| | | |
|---|---|---|
| 959,739 | 2/1957 | Germany. |
| 1,075,675 | 2/1960 | Germany. |

KATHLEEN H. CLAFFY, *Primary Examiner.*

L. A. WRIGHT, *Assistant Examiner.*